United States Patent Office 3,579,662
Patented May 25, 1971

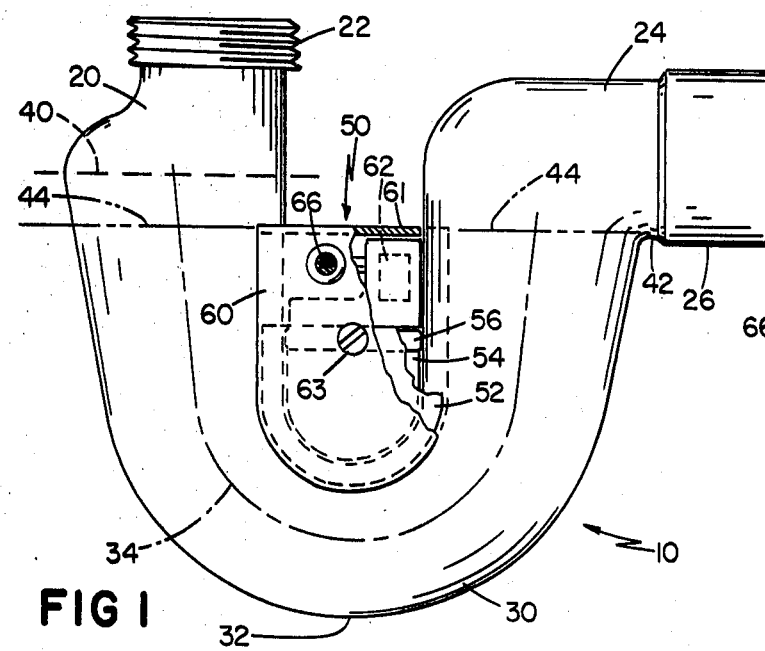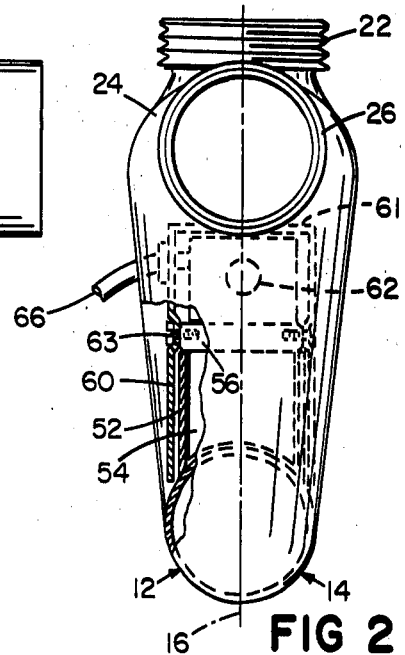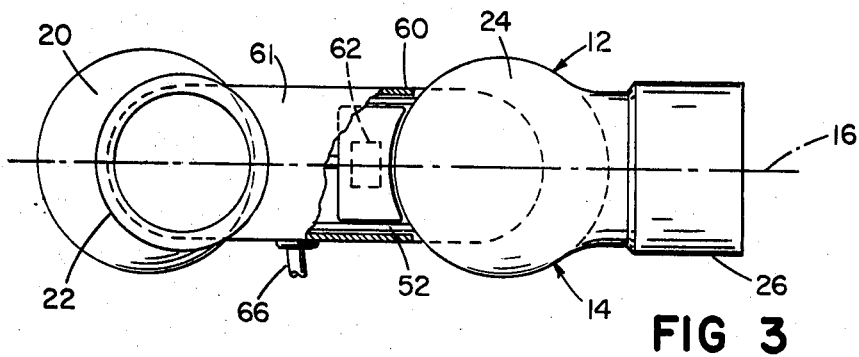

3,579,662
FREEZE PROTECTED WASTE TRAP
Robert D. Lowry and Russell B. Strout, Winchester, Mass., assignors to Lowry Development Corporation, Winchester, Mass.
Filed Mar. 20, 1969, Ser. No. 808,905
Int. Cl. E03c 1/284
U.S. Cl. 4—206  5 Claims

ABSTRACT OF THE DISCLOSURE

A waste trap for water drains having a U-shaped conduit the legs of which have internal transverse cross sectional areas increasing progressively upwardly of said legs to the round top level of water contained in said trap the waste trap being provided with an electrical heater element and thermostatic control.

---

This invention relates to waste traps for water drains, and more particularly to a waste trap having structural characteristics providing protection against damage from freezing of residual water in the trap.

Whenever such drains are located in dwellings which may be subject to freezing temperatures (for example, cottages left unoccupied during winter months) the residual water left in the trap as it freezes may rupture, or otherwise damage the trap. To prevent this, such traps are usually drained but this defeats the purpose of the trap by removing the water block against reverse gas flow. Another precaution is to add an antifreeze solution but this presents problems of expense, reliability and the general undesirability of adding such solutions to the accumulation of waste, particularly in septic tanks. Strengthening the walls of the trap requires excessively expensive, heavy and bulky pipe.

The object of the invention is therefore to provide a waste water trap which need not be pumped out, nor have antifreeze solution added thereto, nor be constructed of extra strong material to withstand ice stresses, and needs no special attention for protection against freeze damage and will continue to serve as a seal against reverse gas flow.

The invention features a trap having an inlet section, an outlet section, and a U-shaped conduit connecting the two. The vertical legs of the conduit extend downwardly from a junction with each end section and have internal cross sectional areas transverse to their center lines increasing progressively upwardly to the junctions. The junction of the U-shaped conduit and the inlet section is slightly above the water level line defined by the highest internal bottom level of the outlet section.

Preferably the U-shaped conduit has circular internal cross-section area and the increase in inside diameter between its bottom and the water level line is desirably 50% (corresponding to an increase in cross-section area of about 200%), and in any event no less than 15% (corresponding to an increase in cross-section area of 30%). In addition, the conduit may be provided with an electrical heater mounted between the downwardly extending portions of the conduit below the water level line, with the option of operating the heater by a thermostatic switch.

Other objects, features, and advantages will appear from the following description of a preferred embodiment of the invention, taken together with the attached drawings thereof, in which:

FIG. 1 is a side view of a trap embodying the invention;
FIG. 2 is an end view of the trap; and,
FIG. 3 is a plan view of the trap.

The drawings show a liquid flow tubular unit 10 made up of two halves 12 and 14 drawn from sheet metal and welded on center line 16.

As shown in FIG. 1 unit 10 includes a 1½ inch vertical inlet section 20 at the left including an externally threaded ring 22 at its top and a generally horizontal outlet section 24 at the right of equal diameter and including a collar 26 suitable for a solder sweat joint.

Unit 10 also includes a U-shaped conduit 30 suspended between and connecting inlet section 20 to outlet section 24. Conduit 30 has a bottom section 32 having an internal diameter about equal to that of the inlet 20 and outlet 24, but in the legs of the U, the internal cross-sectional area transverse to the center-line 34 increases progressively upwardly from bottom 32 towards inlet and outlet sections 20 and 24. In this respect the junction between conduit 30 and inlet section 20 is at line 40 where the internal cross-sectional area of that portion of unit 10 begins to decrease again in the upward direction. Line 40 is slightly above the highest bottom interior surface level 42 of outlet section 24 which defines the normal top water level line 44 of the trap.

The percentage increase in inside diameter of the vertical legs of conduit 30 between bottom 32 and the water level line 44 is shown as being approximately 50%, though adequate protection is afforded when the increase is as low as 15%. On the inlet side of conduit 30 the increase in diameter continues above water level line 44 to the junction line 40.

An electrical heater 50 is shown between the arcuately downwardly extending portions of conduit 30 located below the water level line 44. It includes heater retaining side plates 52 welded in place to conduit 30, a heater element 54 between side plates 52, an insulating block 56 mounted atop heater element 54, and vertical covers 60 secured by screws 63 passing through covers 60 into threaded connection with side plates 52, one of the vertical covers 60 having attached a horizontal cover 61. A thermostatic switch 62 is located above insulating block 56 between covers 60, and an electric cord 66 is shown connected to a junction box also mounted between covers 60 above insulating block 56. The connections between electric cord 66, thermostatic switch 62 and heater element 54 are not shown, being well known to the art. Thermostatic switch 62 senses the temperature of conduit 30 and is adjusted to connect electric cord 66 to heater element 54 to heat the conduit whenever the temperature of the conduit falls to a certain limit, in this case, some temperature above the freezing temperature of water.

In operation, the unit functions like an ordinary waste trap unit in that when water is discharged through the unit and then shut off, water is trapped in the unit up to the water level line 44. Thus operated the water remains as a seal against the reverse flow of obnoxious gases through the drainage system.

In the event of formation of ice in the water trapped in the unit, the taper of the walls will cause the forming ice to lift upwardly in both legs of conduit 30, relieving stresses on the trap walls such as would be present were the cross-sectional areas vertically uniform, as is the case in conventional traps made from piping of uniform internal cross-section. Vertical expansion above water level line 44 is provide for by having the cross section of conduit 30 increase a slight distance above line 44 on the inlet side. On the outlet side, the horizontal orientation of outlet 24 provides expansion space above line 44.

Without a thermostatic switch as shown in this embodiment, electric heater 50 could be energized to melt formed ice in the trap merely whenever use of the trap is contemplated. With thermostatic switch 62 in the heater, formation of ice in the trap will continuously be prevented. In the event of malfunction of the heater or loss of electric power, the trap will not be damaged by formation of ice. The heater may be in fact discarded entirely if use of the trap during cold weather is not contemplated and only protection against trap rupture during that time is contemplated.

Other embodiments will occur to those skilled in the art and are within the following claims.

What is claimed is:

1. A waste trap unit having first and second end sections the first section forming a vertical inlet and the second section forming a horizontal outlet respectively with both said inlet and said outlet being of substantially equal diameter, said end sections being joined by an intervening U-shaped conduit having a bottom section of a diameter substantially equal to that of said inlet and outlet, the internal cross-sectional area of said conduit transverse to the center line of said conduit increasing progressively upwardly on each side of said bottom section to at least the level of the highest bottom interior surface of said horizontal outlet.

2. The unit of claim 1 in which said conduit is circular in internal cross-section transverse to its center line and the increase in diameter of said conduit on both sides of said conduit bottom section exceeds 15% of said conduit bottom section diameter.

3. The unit of claim 2 in which said increase is about 50%.

4. The unit of claim 1 in which said U-shaped conduit is metallic and an electrical heater is located between the legs of said conduit in heat exchange relation with said conduit for melting ice contained in said conduit.

5. The unit of claim 4 having in addition a thermostatic switch connected to said conduit and to said heater for activating said heater when the temperature of said conduit falls below a set minimum temperature above freezing.

References Cited

UNITED STATES PATENTS

| | | | |
|---|---|---|---|
| 1,492,821 | 5/1924 | Weinbach | 219—535X |
| 1,855,024 | 4/1932 | Kersten | 4—252 |
| 1,900,591 | 3/1933 | Taylor | 4—191X |
| 2,390,475 | 12/1945 | Thomas | 219—535X |
| 2,452,367 | 10/1948 | Gangloff | 4—255X |
| 2,593,459 | 4/1952 | Johnson | 219—535X |
| 2,878,483 | 3/1959 | Schmid | 4—252X |
| 2,331,592 | 10/1943 | Bagwell | 4—252X |

FOREIGN PATENTS

| | | | |
|---|---|---|---|
| 760,126 | 10/1956 | Great Britain | 219—535 |
| 864,602 | 1/1941 | France | 219—535 |
| 156,379 | 10/1932 | Switzerland | 219—535 |

LAVERNE D. GEIGER, Primary Examiner

D. B. MASSENBERG, Assistant Examiner